US012730242B1

(12) United States Patent
Liu et al.

(10) Patent No.: US 12,730,242 B1
(45) Date of Patent: Sep. 8, 2026

(54) SEISMIC DATA HIGH-PRECISION IMAGING METHOD AND DEVICE

(71) Applicant: INSTITUTE OF GEOLOGY AND GEOPHYSICS, CHINESE ACADEMY OF SCIENCES, Beijing (CN)

(72) Inventors: Linong Liu, Beijing (CN); Shuaishuai Li, Beijing (CN); Zhitao Yu, Beijing (CN); Jiangjie Zhang, Beijing (CN)

(73) Assignee: INSTITUTE OF GEOLOGY AND GEOPHYSICS, CHINESE ACADEMY OF SCIENCES, Beijing (CN)

( * ) Notice: Subject to any disclaimer, the term of this patent is extended or adjusted under 35 U.S.C. 154(b) by 0 days.

(21) Appl. No.: 19/301,849

(22) Filed: Aug. 15, 2025

(30) Foreign Application Priority Data

Apr. 1, 2025 (CN) ........................ 202510402469.6

(51) Int. Cl.
*G01V 1/36* (2006.01)
*G06N 3/0464* (2023.01)

(52) U.S. Cl.
CPC .......... *G01V 1/362* (2013.01); *G06N 3/0464* (2023.01); *G01V 2210/165* (2013.01); *G01V 2210/512* (2013.01)

(58) Field of Classification Search
None
See application file for complete search history.

(56) References Cited

U.S. PATENT DOCUMENTS 5,671,136 A * 9/1997 Willhoit, Jr. ............ G01V 1/30 702/18

FOREIGN PATENT DOCUMENTS

CN 111983682 A 11/2020

OTHER PUBLICATIONS

Ma, L., Han, L. & Feng, Q. Deep learning for high-resolution seismic imaging. Sci Rep 14, 10319 (2024). https://doi.org/10.1038/s41598-024-61251-8 (Year: 2024).*

(Continued)

*Primary Examiner* — Lina Cordero
(74) *Attorney, Agent, or Firm* — Tarolli, Sundheim, Covell & Tummino LLP

(57) ABSTRACT

Provided are seismic data high-precision imaging method and device. The method includes: acquiring prestack seismic gather of work zone to be imaged; performing the multi-azimuth prestack migration processing on the prestack seismic gather by the fixed migration aperture for each imaging line in the imaging space, so as to obtain the set of multi-azimuth migration imaging profiles of each imaging line; and processing the set of multi-azimuth migration imaging profiles of the target imaging line by using the target neural network model, so as to obtain the high-precision migration imaging profile of the target imaging line. The target neural network model is a lightweight neural network based on the Transformer and the CNN, and the training target of the target neural network model is that the error between the output prediction result of migration imaging profile and the actual high-precision migration imaging profile result is smaller than the preset threshold.

12 Claims, 3 Drawing Sheets

(56) References Cited

OTHER PUBLICATIONS

C. Ning, B. Wu and Z. Zhu, "Transformer and CNN Hybrid Neural Network for Seismic Impedance Inversion," IGARSS 2023—2023 IEEE International Geoscience and Remote Sensing Symposium, Pasadena, CA, USA, 2023, pp. 5543-5546, doi: 10.1109/IGARSS52108.2023.10281611 (Year: 2023).*

J.-Y. Park, O. M. Saad, J.-W. Oh and T. Alkhalifah, "Transformer-Based Seismic Image Enhancement: A Novel Approach for Improved Resolution," in IEEE Transactions on Geoscience and Remote Sensing, vol. 63, pp. 1-10, 2025, Art No. 5901210, doi: 10.1109/TGRS.2024.3510863 (Year: 2025).*

CNOA: Office Action issued May 16, 2025 for corresponding CN202510402469.6; Eng. translation provided.

ZHUetal: "Research on Noise suppression of seismic migration based on deep learning" Progress in Geophysics, 37 (2): 0746-0755, doi: 10.6038/ph2022FF0121; 2022.

NoticeOfGrantOfInventionPatentRightCN2025104024696.

* cited by examiner

SEISMIC DATA HIGH-PRECISION IMAGING METHOD AND DEVICE

CROSS-REFERENCE TO RELATED APPLICATIONS

The present disclosure claims the priority to the Chinese patent application with the filling No. 202510402469.6 filed with the Chinese Patent Office on Apr. 1, 2025, and entitled "SEISMIC DATA HIGH-PRECISION IMAGING METHOD AND DEVICE", the contents of which are incorporated herein by reference in entirety.

TECHNICAL FIELD

The present disclosure relates to the technical field of seismic exploration, and particularly relates to a seismic data high-precision imaging method and a device.

BACKGROUND ART

In seismic exploration, obtaining information on complex subsurface structures by performing migration processing on seismic observation data acquired at the surface has long been a key objective for geophysicists. This process is generally referred to as seismic data imaging. For most migration processing method practices, the selection of migration aperture is an important task. A smaller migration aperture can reduce the migration computational cost, but there is a risk that correct imaging cannot be constructed for steep dip-angles. Too large migration aperture introduces the migration noise and a larger migration computational cost. An appropriate migration aperture can suppress the migration noise and improve the computational efficiency of migration processing.

Due to the implementation limitations of migration algorithms, a uniform migration aperture is usually selected in the migration operation. However, since the subsurface structural dip-angle varies with spatial position, a migration aperture appropriate for one imaging point may be too large or too small for other imaging points. Additionally, the dip-angle of the target imaging structure cannot be accurately estimated before the migration processing. The migration aperture can only be selected in a conservative method, i.e., selecting a larger aperture. It leads to that the migration noise cannot be well suppressed, which in turn results in an unclear imaging profile.

In summary, the prior seismic data imaging method has the technical problem of low imaging precision.

SUMMARY

The objective of the present disclosure is to provide a seismic data high-precision imaging method and a device to solve the technical problem of low imaging precision existed in the seismic data imaging method.

In a first aspect, the present disclosure provides a seismic data high-precision imaging method, including: acquiring a prestack seismic gather of a work zone to be imaged; performing multi-azimuth prestack migration processing on the prestack seismic gather by a fixed migration aperture for each imaging line in an imaging space of the work zone to be imaged, so as to obtain a set of multi-azimuth migration imaging profiles of each imaging line; processing a set of multi-azimuth migration imaging profiles of a target imaging line by using a target neural network model to obtain a high-precision migration imaging profile of the target imaging line, wherein the target neural network model is a lightweight neural network constructed from a Transformer neural network and a CNN neural network, and the Transformer neural network is located between an encoder block and a decoder block of the CNN neural network; a training target of the target neural network model is that an error between the prediction result of the output migration image profile and the actual high-precision migration image profile is smaller than a preset threshold; the target imaging line represents any imaging line in the imaging space; and determining a high-precision imaging result of the work zone to be imaged based on high-precision migration imaging profiles of all imaging lines.

Optionally, it further includes: acquiring a prestack seismic gather of a training work zone; determining high-precision migration imaging profiles of multiple typical imaging lines and a corresponding set of multi-azimuth migration imaging profiles based on the prestack seismic gather of the training work zone, wherein each of the high-precision migration imaging profiles is an imaging profile obtained by performing migration processing using a Fresnel zone of the imaging point as the migration aperture; taking a set of multi-azimuth migration imaging profiles of each of the typical imaging lines as input data of the initial neural network model; taking the corresponding high-precision migration imaging profiles as training labels; and training the initial neural network model until reaching the training target, so as to obtain the target neural network model.

Optionally, the step of determining high-precision migration imaging profiles of multiple typical imaging lines based on the prestack seismic gather of the training work zone includes: computing a multi-azimuth dip-angle domain migration gather of a target typical imaging line based on the prestack seismic gather of the training work zone, wherein the target typical imaging line represents any imaging line in the multiple typical imaging lines; picking up Fresnel zones of multiple typical imaging points by human-computer interaction based on the multi-azimuth dip-angle domain migration gather; and performing prestack migration processing on the prestack seismic gather of the training work zone using the Fresnel zones of the multiple typical imaging points as the migration aperture, so as to obtain the high-precision migration imaging profile of the target typical imaging line.

Optionally, the initial neural network model further includes: a normalization layer and a denormalization layer, and the step of taking a set of multi-azimuth migration imaging profiles of each of the typical imaging lines as input data of the initial neural network model; taking the corresponding high-precision migration imaging profiles as training labels; and training the initial neural network model includes: performing normalization processing on the set of multi-azimuth migration imaging profiles of the target typical imaging line and the corresponding high-precision migration imaging profile respectively by the normalization layer, so as to obtain a set of amplitude-normalized multi-azimuth migration imaging profiles and an amplitude-normalized high-precision migration imaging profile; encoding each local time window data in the set of amplitude-normalized multi-azimuth migration imaging profiles by the encoder block, so as to extract a local feature and profile position information of each local time window data; performing feature expansion on local features of all local time window data to construct a long sequence of local feature; extracting a global feature and an effective feature of the long sequence of local feature by the Transformer neural network, so as to obtain a target feature sequence; performing feature folding on the target feature sequence, and decoding the folded feature and the profile position information by the decoder block, so as to obtain a reconstructed migration imaging profile; computing a loss function value based on the reconstructed migration imaging profile and the amplitude-normalized high-precision migration imaging profile, so as to train the initial neural network model based on the loss function value; and performing denormalization processing on the reconstructed migration imaging profile by the denormalization layer based on the set of multi-azimuth migration imaging profiles of the target typical imaging line and the corresponding high-precision migration imaging profile, so as to obtain a high-precision migration imaging profile after amplitude recovery.

Optionally, the step of performing normalization processing on the set of multi-azimuth migration imaging profiles of the target typical imaging line and the corresponding high-precision migration imaging profile respectively by the normalization layer includes: determining an amplitude value of each position point in the set of multi-azimuth migration imaging profiles of the target typical imaging line, so as to obtain an amplitude value set corresponding to each migration imaging profile; stacking amplitude values with the same serial number in all amplitude value sets, and taking absolute values after the stack, so as to obtain a first target amplitude value set; taking a maximum amplitude value in the first target amplitude value set as a normalization parameter of the set of multi-azimuth migration imaging profiles, so as to perform the normalization processing on the set of multi-azimuth migration imaging profiles; determining an amplitude value of each position point in the high-precision migration imaging profile of the target typical imaging line, and taking an absolute value, so as to obtain a second target amplitude value set; and taking a maximum amplitude value in the second target amplitude value set as a normalization parameter of the high-precision migration imaging profile, so as to perform the normalization processing on the high-precision migration imaging profile.

Optionally, the step of performing denormalization processing on the reconstructed migration imaging profile by the denormalization layer based on the set of multi-azimuth migration imaging profiles of the target typical imaging line and the corresponding high-precision migration imaging profile includes: determining the amplitude value of each position point in the set of multi-azimuth migration imaging profiles of the target typical imaging line, so as to determine an average energy of the set of multi-azimuth migration imaging profiles based on the amplitude value to obtain a first energy; determining the amplitude value of each position point in the high-precision migration imaging profile of the target typical imaging line, so as to determine an average energy of the high-precision migration imaging profile based on the amplitude value to obtain a second energy, and determining a maximum amplitude in the high-precision migration imaging profile; determining a denormalization parameter of the reconstructed migration imaging profile based on the first energy, the second energy, and the maximum amplitude; and performing the denormalization processing on the reconstructed migration imaging profile based on the denormalization parameter, so as to obtain the high-precision migration imaging profile after the amplitude recovery.

Optionally, selection criteria for the typical imaging line are as follows: selecting the imaging line based on first spacing at a position with drastic structure changes; selecting the imaging line based on second spacing at a position with gentle structures; and the first spacing being smaller than the second spacing.

In a second aspect, the present disclosure provides a seismic data high-precision imaging device, including: a first acquisition module, configured to acquire a prestack seismic gather of a work zone to be imaged; a migration module, configured to perform multi-azimuth prestack migration processing on the prestack seismic gather by a fixed migration aperture for each imaging line in an imaging space of the work zone to be imaged, so as to obtain a set of multi-azimuth migration imaging profiles of each imaging line; a processing module, configured to process a set of multi-azimuth migration imaging profiles of a target imaging line by using a target neural network model to obtain a high-precision migration imaging profile of the target imaging line, wherein the target neural network model is a lightweight neural network constructed from a Transformer neural network and a CNN neural network, the Transformer neural network is located between an encoder block and a decoder block of the CNN neural network, a training target of the target neural network model is that an error between the prediction result of the output migration image profile and the actual high-precision migration image profile is smaller than a preset threshold, and the target imaging line represents any imaging line in the imaging space; and a first determination module, configured to determine a high-precision imaging result of the work zone to be imaged based on high-precision migration imaging profiles of all imaging lines.

In a third aspect, the present disclosure provides an electronic device, including a memory and a processor, wherein the memory stores computer programs runnable on the processor, and the seismic data high-precision imaging method according to any one of the above embodiments is realized when the processor executes the computer program.

In a fourth aspect, the present disclosure provides a computer-readable storage medium, wherein the computer-readable storage medium stores computer instructions, and the seismic data high-precision imaging method according to any one of the above embodiments is realized when the computer instructions are executed by the processor.

The present disclosure provides a seismic data high-precision imaging method. After acquiring the prestack seismic gather of the work zone to be imaged, it firstly performs the multi-azimuth prestack migration processing on the prestack seismic gather by the fixed migration aperture for each imaging line in an imaging space, so as to obtain the set of multi-azimuth migration imaging profiles of each imaging line; and then it processes the set of multi-azimuth migration imaging profiles of the target imaging line by using the target neural network model, so as to obtain the high-precision migration imaging profile of the target imaging line. The target neural network model is a lightweight neural network constructed from the Transformer neural network and the CNN neural network, and the training target of the target neural network model is that the error between the output prediction result of the migration imaging profile and the actual high-precision migration imaging profile result is smaller than the preset threshold. Therefore, it can ensure that the output migration imaging profile is of a high-precision imaging result, which effectively solves the technical problem of low imaging precision existed in the seismic data imaging method.

BRIEF DESCRIPTION OF DRAWINGS

In order to more clearly illustrate the technical solutions in the specific embodiments or prior art of the present disclosure, the drawings to be used in the description of the specific embodiments or prior art will be briefly introduced below. It is obvious that the drawings in the following description are some embodiments of the present disclosure, and for persons of ordinary skill in the art, other drawings can be obtained based on these drawings without inventive efforts.

DETAILED DESCRIPTION OF EMBODIMENTS

Figure 1:
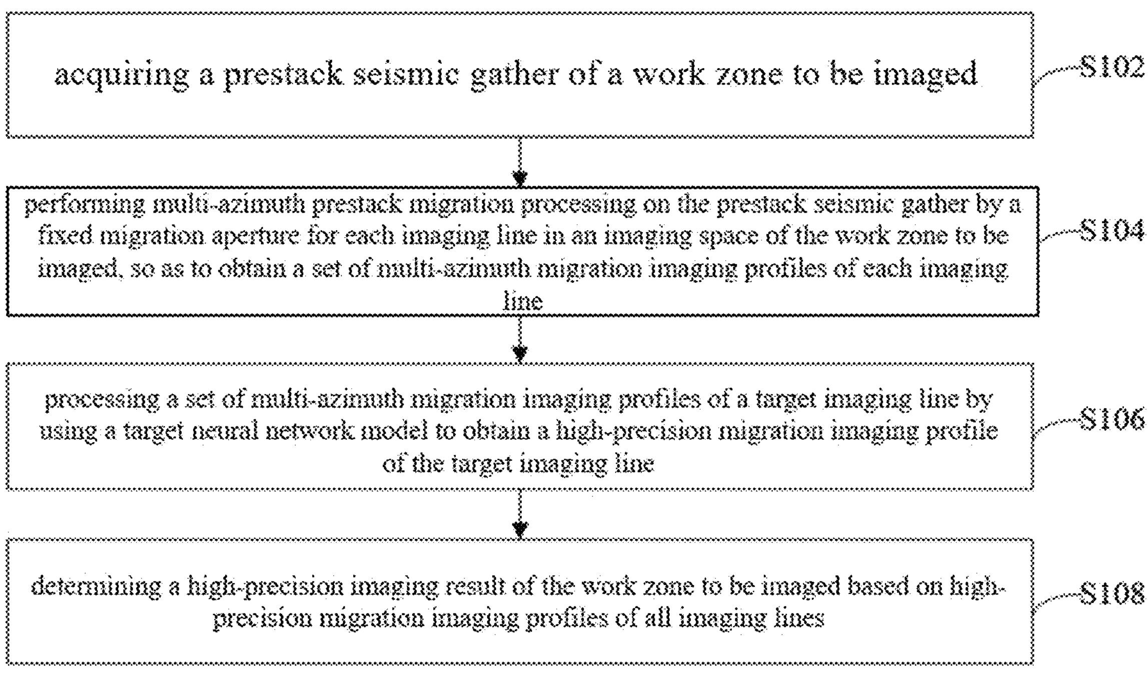
FIG. 1 shows a flow diagram of a seismic data high-precision imaging method provided by the embodiments of the present disclosure.

In order to make the objectives, technical solutions, and advantages of the embodiments of the present disclosure clearer, the technical solutions in the embodiments of the present disclosure will be clearly and completely described in conjunction with the drawings in the embodiments of the present disclosure. It is clear that the embodiments described are partial embodiments of the present disclosure, but not all of the embodiments. The components in the embodiments of the present disclosure generally described and shown in the drawings herein may be arranged and designed in multiple different configurations.

Therefore, the following detailed description of embodiments of the present disclosure provided in the drawings is not intended to limit the scope of the present disclosure for which protection is claimed, but rather represents only selected embodiments of the present disclosure. Based on the embodiments in the present disclosure, all other embodiments obtained by a person of ordinary skill in the art without making creative labor fall within the scope of protection of the present disclosure.

Some embodiments of the present disclosure are described in detail below in conjunction with the drawings. The following embodiments and features in the embodiments can be combined with each other without conflict.

Embodiment 1

In the prior art, before the seismic migration imaging, if the conservative method is used to select a relatively large migration aperture, it will lead to poor suppression of migration noise, which in turn results in an unclear imaging profile. Research shows that, during the process of migration imaging, if the Fresnel zone of the imaging point is used as the migration aperture to perform migration calculation, correct imaging of steep dip-angle and migration noise suppression can both be achieved. Strictly speaking, the Fresnel zone for each imaging point needs to be determined based on a full-azimuth (multi-azimuth) dip-angle domain migration gather. However, since the number of imaging points in the whole work zone is huge, the determination of the Fresnel zone of all imaging points will consume huge computational and storage resources.

In order to reduce the requirements for the amount of computation and the storage resources, generally, it firstly constructs dip-angle domain migration gathers along the Inline direction and the Crossline direction during the migration process, so as to directly display the Fresnel zone in the above migration gathers vividly; then, it is to construct a rectangle by regarding the dip-angle values corresponding to the Fresnel zones in Inline direction and Crossline direction picked up by human-computer interaction based on the dip-angle domain migration gather of each imaging point as long and short sides of a rectangle, and the constructed rectangle is approximately regarded as the Fresnel zone region of the imaging point, i.e., the migration aperture; and then, it is to apply the obtained migration aperture to the migration process for reprocessing, so as to obtain a migration imaging result considering both the dip-angle imaging and the migration noise suppression.

However, in the foregoing prestack migration technique using the Fresnel zone of the imaging point as the migration aperture, on the one hand, the rectangle constructed by the dip-angles corresponding to the Fresnel zone edges in the Inline direction and the Crossline direction picked up by the human-computer interaction is approximately regarded as the Fresnel zone region of this imaging point, where this method is based on the basic assumption that the subsurface three-dimensional constructions all changes gently except in the Inline direction and the Crossline direction. However, when the subsurface three-dimensional construction is more complex and exhibits significant variations in multiple azimuths, this approximation may lead to inaccurate migration aperture settings, which in turn can result in the loss of steep-dip structures in certain azimuths within the migrated imaging results. On the other hand, as a key part of the prior art implementation process, the data process personnel consume a large amount of time even if the migration aperture is determined by picking up the Fresnel zone edges of the imaging point in the Inline direction and Crossline direction by human-computer interaction based on the dip-angle domain migration gather, which severely limits the popularization of the application of this technology. That is to say, the above prestack migration technique, using the Fresnel zones in the Inline direction and Cross direction of the imaging point as the migration aperture, still has problems of lower precision and a large amount of time by the data process personnel.

In view of this, the embodiments of the present disclosure provide a seismic data high-precision imaging method for solving the technical problems addressed above. FIG. 1 shows a flow diagram of a seismic data high-precision imaging method provided by the embodiments of the present disclosure. As shown in FIG. 1, the method specifically includes the following steps: S102~S108.

Step S102: acquiring a prestack seismic gather of a work zone to be imaged.

Step S104: performing multi-azimuth prestack migration processing on the prestack seismic gather by a fixed migration aperture for each imaging line in an imaging space of the work zone to be imaged, so as to obtain a set of multi-azimuth migration imaging profiles of each imaging line.

In the embodiments of the present disclosure, the source data used for the high-precision imaging of the work zone to be imaged is the prestack seismic gather of the work zone, and the prestack seismic gather can be acquired by a specialized seismic data acquisition device. Next, it is to perform low precision imaging for each imaging line in the work zone. Specifically, it is to perform the multi-azimuth prestack migration processing on the prestack seismic gather by the fixed migration aperture, so as to obtain a set of multi-azimuth migration imaging profiles of each imaging line. That is to say, multiple migration imaging profiles are output for each imaging line, wherein each migration imaging profile is obtained by performing the migration processing on the seismic data input from the corresponding azimuth. In the embodiments of the present disclosure, the fixed migration aperture is not smaller than a maximum dip-angle (known parameter) of the subsurface target structure to be imaged.

If the imaging space contains $N_{line}$ imaging lines, each imaging line contains $N_{CDP}$ dcommon depth points (CDPs), and each CDP contains $N_s$ imaging points. If the coordinate of any one of the imaging points is (x,y,T), then its multi-azimuth migration imaging result is expressed as:

$$I(x, y, T_0, \theta_i) = \sum_{j=1}^{k}\left(\frac{\tau_s}{\tau_g}\right)^2 f_j'(\tau_s + \tau_g; x_s, y_s, x_g, y_g)w(\varphi_x, \varphi_y),$$

$$i = 0, 1, 2 \ldots n_{AZIMUTH} - 1,$$

where the $$n_{AZIMUTH} = \text{int}\left(\frac{360}{\Delta\theta}\right)$$

represents the number of azimuthal intervals; $\Delta\theta$ represents the length (interval) of the pre-set azimuthal interval; $T_0=2T$ represents the seismic wave two-way traveltime; $\tau_s$ and $\tau_g$ respectively represent travel times of seismic waves propagating from the source point $(x_s, y_s)$ to the imaging point (x,y,T) and from the imaging point to the receiving point $(x_g,y_g)$; $f_j'(\tau_s+\tau_g; x_s, y_s, x_g, y_g)$ represents the first-order time derivative of the seismic data sequence when acquiring the j-th seismic trace; k represents the number of seismic traces of all input prestack seismic gathers; i represents the azimuthal number of the seismic trace, $$i = \text{int}\left(\frac{\theta}{\Delta\theta}\right),$$

where $\theta$ represents the azimuthal angle of the seismic trace and is calculated by the following formula:

$$\begin{cases} \theta = \arccos\left[\dfrac{(x_g - x_s)}{\sqrt{(x_g - x_s)^2 + (y_g - y_s)^2}}\right], \text{ if } y_g \geq y_s \\ \theta = 2\pi - \arccos\left[\dfrac{(x_g - x_s)}{\sqrt{(x_g - x_s)^2 + (y_g - y_s)^2}}\right], \text{ if } y_g \leq y_s \end{cases}.$$

The $w(\varphi_x, \varphi_y)$ is the weight function, which represents the application of the fixed migration aperture during the migration process, and its expression is:

$$w(\varphi_x, \varphi_y) = \begin{cases} 1, & \varphi_x \leq \varphi_{x0} \; \& \; \varphi_y \leq \varphi_{y0} \\ 0, & \text{other} \end{cases},$$

where $\varphi_{x0}$ and $\varphi_{y0}$ respectively represent the maximum stratum dip-angle (the input migration parameters, which are constants) in the x-direction and y-direction of the work zone, $$\varphi_x = \arctan\frac{(x_s - x)\tau_g + (x_g - x)\tau_s}{V_{rms}T_0(\tau_s + \tau_g)} \text{ and } \varphi_y = \arctan\frac{(y_s - y)\tau_g + (y_g - y)\tau_s}{V_{rms}T_0(\tau_s + \tau_g)},$$

where $V_{rms}$ represents the root-mean-square velocity of the vrmsTO (Ts+Tg) imaging point (which is also a known migration parameter).

Based on the expression of $I(x, y, T_0, \theta_i)$, it can be known that $I(x, y, T_0, \theta_i)$ is a four-dimensional dataset with the dimension sizes of $N_{CDP}$, $N_{line}$, $N_s$, and $n_{AZIMUTH}$. If y, $\theta_i$, and x do not change and only $T_0$ changes, it is a single azimuth imaging result at the same CDP, called a single azimuth imaging seismic trace; if y and $\theta_i$ do not change, and x and $T_0$ change, it is a single azimuth imaging result at the same imaging line, called a single azimuth imaging profile; and if only y does not change, and $\theta_i$, x, and $T_0$ change, it is a multi-azimuth imaging result at the same imaging line, called a set of multi-azimuth migration imaging profiles.

Step S106: processing a set of multi-azimuth migration imaging profiles of a target imaging line by using a target neural network model to obtain a high-precision migration imaging profile of the target imaging line.

It is known that, after performing the prestack migration processing on the fixed migration aperture, the imaging precision of the migration imaging profile obtained is lower, and therefore, the embodiment of the present disclosure pre-trains a target neural network model. The target neural network model is a lightweight neural network constructed from a Transformer neural network and a CNN neural network, and the Transformer neural network is located between an encoder block and a decoder block of the CNN neural network; and a training target of the target neural network model is that an error between the prediction result of the output migration image profile and the actual high-precision migration image profile is smaller than a preset threshold. Optionally, the actual high-precision migration imaging profile is an imaging result obtained by determining the Fresnel zone of the imaging point based on the multi-azimuth dip-angle domain migration gather and taking the result as the migration aperture for migration computation.

That is to say, after inputting the set of multi-azimuth migration imaging profiles of the target imaging line into the target neural network model, the prediction result of migration imaging profile output by the target neural network model is the high-precision migration imaging profile of the target imaging line, wherein the target imaging line represents any imaging line in the imaging space.

The target neural network model combines advantages of the CNN neural network and the Transformer neural network, which significantly reduces the GPU memory requirement of training and the training duration of the neural network, so as to improve the computational efficiency. Moreover, when the seismic data processing personnel performs the multi-azimuth migration processing on the input seismic data (i.e., prestack seismic gather) by only applying the fixed migration aperture, the application of the target neural network model in the prestack migration imaging process can enable both the correct imaging of the subsurface dip-angle structure and the migration noise suppression, which not only reduces the huge workload of determining the migration aperture of the imaging space, but also improves the precision of the migration imaging.

Step S108: determining a high-precision imaging result of the work zone to be imaged based on high-precision migration imaging profiles of all imaging lines.

The embodiments of the present disclosure take the set of high-precision migration imaging profiles of all imaging lines as the high-precision imaging result of the work zone to be imaged.

In the seismic data high-precision imaging method provided by the embodiments of the present disclosure, after acquiring the prestack seismic gather of the work zone to be imaged, it firstly performs the multi-azimuth prestack migration processing on the prestack seismic gather by the fixed migration aperture for each imaging line in an imaging space, so as to obtain the set of multi-azimuth migration imaging profiles of each imaging line; and then it processes the set of multi-azimuth migration imaging profiles of the target imaging line by using the target neural network model, so as to obtain the high-precision migration imaging profile of the target imaging line. The target neural network model is a lightweight neural network based on the Transformer neural network and the CNN neural network, and the training target of the target neural network model is that the error between the output prediction result of the migration imaging profile and the actual high-precision migration imaging profile result is smaller than the preset threshold. Therefore, it can ensure that the output migration imaging profile is of a high-precision imaging result, which effectively solves the technical problem of low imaging precision existed in the seismic data imaging method.

As described above, the embodiments of the present disclosure use a trained target neural network model when performing the seismic data high-precision imaging, and the method of obtaining the target neural network model by training is specifically described below. In an optional embodiment, the embodiment of the present disclosure further includes the following steps:

- step S201: acquiring the prestack seismic gather of the training work zone;
- step S202: determining high-precision migration imaging profiles of multiple typical imaging lines and a corresponding set of multi-azimuth migration imaging profiles based on the prestack seismic gather of the training work zone, wherein each of the high-precision migration imaging profiles is an imaging profile obtained by performing migration processing using a Fresnel zone of the imaging point as the migration aperture; and
- step S203: taking a set of multi-azimuth migration imaging profiles of each of the typical imaging lines as input data of the initial neural network model; taking the corresponding high-precision migration imaging profiles as training labels; and training the initial neural network model until reaching the training target, so as to obtain the target neural network model.

Specifically, the embodiment of the present disclosure does not specifically limit the number and position of the training work zones. If the number of training work zones is 1, the training work zone is a work zone to be imaged; or if the number of training work zones is multiple, it is not limited to include the above work zone to be imaged. Theoretically, if the number of training work zones is larger, the training sample of the model has a better diversity, which in turn provides a stronger generalization ability of the target neural network.

After obtaining the prestack seismic gather of the training work zone, it can refer to the method in step S104 above, wherein the set of multi-azimuth migration imaging profiles of the multiple typical imaging lines is determined based on the prestack seismic gather of the training work zone, and the high-precision migration imaging profile of each typical imaging line is an imaging profile obtained by performing the migration processing by taking the Fresnel zone of the imaging point as the migration aperture. In order to ensure the precision of the training label, the Fresnel zone of the imaging point is determined based on the multi-azimuth dip-angle domain migration gather. In the embodiment of the present disclosure, the multi-azimuth structure needs to include more than 2 azimuths, and the number of azimuths included in the multi-azimuth structure is $n_{AZIMUTH}$, and $$n_{AZIMUTH} = \mathrm{int}\left(\frac{360}{\Delta\theta}\right),$$

where $\Delta\theta$ represents the length of the pre-set azimuth.

In an optional embodiment, the selection criterion for the typical imaging line is: selecting the imaging line based on first spacing at a position with drastic structure changes; selecting the imaging line based on second spacing at a position with gentle structures; and the first spacing being smaller than the second spacing.

Specifically, at the position with the dramatic structure change, the geological structure is more complex. Therefore, in order to ensure the precision and reliability of the imaging result, a denser imaging line (first spacing) is required to capture detailed geological information. At the position with a gentle structure, the geological structure is relatively simple. The sparser imaging line (second spacing) can be used to reduce the amount of data and the processing duration, and it can still obtain sufficient geological information. Moreover, by using the first spacing to select the imaging line at the region with the dramatic structure changes, the limited resources can be utilized more efficiently to ensure the detailed imaging of the critical region. By using the second spacing to select the imaging line at the region with a gentle structure, it can reduce unnecessary data processing to save time and cost. The above flexible selection criterion for the typical imaging line can be adjusted according to different geological conditions, so as to ensure high-quality imaging result in various geological environments and optimize the use of resources.

After obtaining the high-precision migration imaging profiles of the multiple typical imaging lines and the corresponding set of multi-azimuth migration imaging profiles, by taking all set of multi-azimuth migration imaging profiles as the input dataset for training the initial neural network, and by taking all high-precision migration imaging profiles as the label dataset for training the initial neural network, the initial neural network model is trained based on the corresponding relationship between the input data and the label data. The training can be finished until the error between the prediction result of migration imaging profile output by the model and the training label is smaller than the preset threshold, and thus the target neural network model is obtained.

In an optional embodiment, the above step S202 of determining the high-precision migration imaging profiles of multiple typical imaging lines based on the prestack seismic gather of the training work zone includes the following steps:

step S2021: computing a multi-azimuth dip-angle domain migration gather of the target typical imaging line based on the prestack seismic gather of the training work zone, wherein the target typical imaging line represents any imaging line in the multiple typical imaging lines;

step S2022: picking up Fresnel zones of the multiple typical imaging points by human-computer interaction based on the multi-azimuth dip-angle domain migration gather; and step S2023: performing prestack migration processing on the prestack seismic gather of the training work zone using the Fresnel zones of the multiple typical imaging points as the migration aperture, so as to obtain the high-precision migration imaging profile of the target typical imaging line.

In the prior art of prestack migration using the Fresnel zone of the imaging point as the migration aperture, the Fresnel zones in the Inline direction and the Crossline direction picked up by the human-computer interaction are used as the migration aperture. Compared with the prior art, when determining the training label, the embodiment of the present disclosure constructs a "multi-azimuth (i.e., full-azimuth)" dip-angle domain migration gather, and then picks up the Fresnel zone of the typical imaging point by human-computer interaction. Compared with the method in the prior art of picking up the dip-angle domain migration gather based on two azimuths (i.e., Inline direction and Crossline direction), the Fresnel zone obtained is more precisely, so as to ensure the precision of the prestack migration processing result. The embodiment of the present disclosure does not specifically limit the selection method of the typical imaging point, and it can refer to the selection criterion of typical imaging line. That is, the selected imaging point is relatively dense at the position with the drastic structure change, and the selected imaging point is relatively sparse at the position with the gentle structure.

In an optional embodiment, the initial neural network model further includes: a normalization layer and a denormalization layer. The above step S203 of taking the set of multi-azimuth migration imaging profiles of each of the typical imaging lines as input data of the initial neural network model; taking the corresponding high-precision migration imaging profile as the training label; and training the initial neural network model includes the following steps: S2031~S2037.

Step S2031: performing normalization processing on the set of multi-azimuth migration imaging profiles of the target typical imaging line and the corresponding high-precision migration imaging profile respectively by the normalization layer, so as to obtain the set of amplitude-normalized multi-azimuth migration imaging profiles and the amplitude-normalized high-precision migration imaging profile.

Specifically, given that the seismic data amplitude range is too large, possibly up to millions, it is not conducive to computation if it is directly inputted into the neural network. Therefore, the embodiments of the present disclosure narrow the value range of the input data and the label data by the normalization, so as to facilitate the training of the initial neural network model. Additionally, considering that the seismic data amplitude (the value range) varies greatly, using the same normalization parameter to normalize the input data and the label data can result in a larger error between the predicted amplitude and the actual amplitude during inference with the trained neural network. In view of this, the embodiment of the present disclosure needs to respectively compute the normalization parameter of the set of multi-azimuth migration imaging profiles and the normalization parameter of the high-precision migration imaging profile, and then perform the normalization processing on both of them respectively.

Step S2032: encoding each local time window data in the set of amplitude-normalized multi-azimuth migration imaging profiles by the encoder block, so as to extract a local feature and profile position information of each local time window data.

Step S2033: performing feature expansion on local features of all local time window data to construct a long sequence of the local feature.

Step S2034: extracting a global feature and an effective feature of the long sequence of the local feature by the Transformer neural network, so as to obtain a target feature sequence.

Step S2035: performing feature folding on the target feature sequence, and decoding the folded feature and the profile position information by the decoder block, so as to obtain a reconstructed migration imaging profile.

Step 2036: computing a loss function value based on the reconstructed migration imaging profile and the amplitude-normalized high-precision migration imaging profile, so as to train the initial neural network model based on the loss function value.

Step 2037: performing denormalization processing on the reconstructed migration imaging profile by the denormalization layer based on the set of multi-azimuth migration imaging profiles of the target typical imaging line and the corresponding high-precision migration imaging profile, so as to obtain a high-precision migration imaging profile after amplitude recovery.

Figure 2:
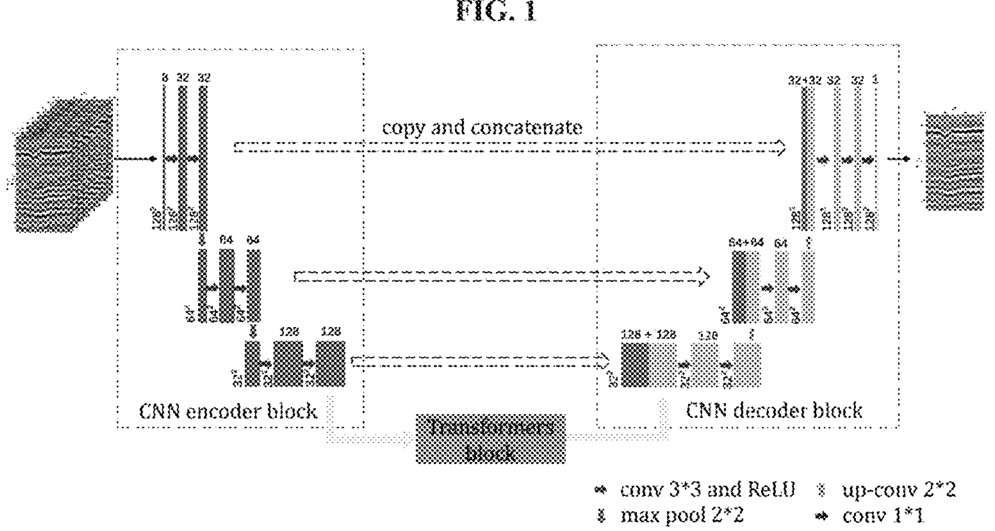
FIG. 2 shows a schematic flow diagram of data processing of an initial neural network model provided by the embodiments of the present disclosure.

In the embodiment of the present disclosure, the neural network model is a multi-input and single-output network, wherein the input is a set of multi-azimuth migration imaging profiles, and the output is a reconstructed high-precision migration profile after the neural network extraction and the combination of features of set of multi-azimuth migration imaging profiles. FIG. 2 shows a schematic flow diagram of data processing of an initial neural network model provided by the embodiments of the present disclosure. The convolution neural network (CNN) includes an encoder block and a decoder block. The embodiments of the present disclosure do not specifically limit the structure of the encoder block and the decoder block, and they only need to realize the above encoding function and decoding function.

In an optional embodiment, each layer in the encoder block contains two 3×3 convolution operations for the feature extraction and feature mapping of the data, wherein its activation layer adopts ReLU as an activation function to increase the nonlinear mapping, and its pooling layer is a maximum pooling of 2×2, which is used for feature extraction and down-sampling of the data, thus reducing parameters of the neural network to facilitate the subsequent training of the Transformer model. In the decoder block, each layer contains two 3×3 convolution operations, where ReLU serves as the activation layer of the activation function and is used to recover the sampling size of the data and reduce the number of channels, along with an upsampling operation of size 2×2. Additionally, its last layer adds a 1×1 convolution kernel for combining and reconstructing the high-precision migration resultant data.

Figure 3:
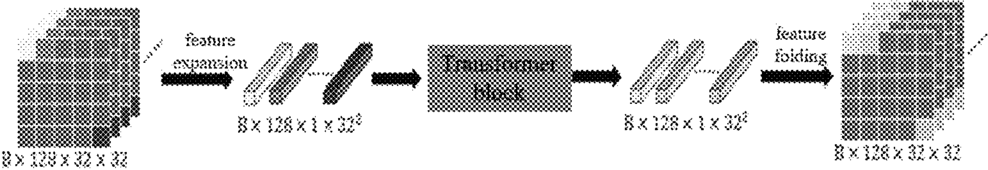
FIG. 3 shows a schematic diagram of a conversion flow from output data of an encoder block to input data of a decoder block provided by the embodiments of the present disclosure.

FIG. 3 shows a schematic diagram of a conversion flow from the output data of the encoder block to the input data of the decoder block provided by the embodiment of the present disclosure. As shown in FIG. 3, the data output by the encoder block is essentially multiple two-dimensional feature image blocks, and multiple one-dimensional sequences can be obtained by flattening the components at the same position of the multiple two-dimensional feature image blocks into one-dimensional ones (i.e., the feature expansion). The long sequence of local feature used for inputting the Transformer neural network can be constructed by connecting the above multiple one-dimensional sequences end-to-end in a specified order. The Transformer neural network can capture the global feature and the effective feature included in the input data, so as to obtain the target feature sequence, where the global feature represents the features possessed by the sample data as a whole, and the effective features represent the features of the valid data within the sample, excluding noise and other interferences. Next, it is to fold the target feature sequence, so as to construct multiple two-dimensional feature image blocks with the same data structure as the output data of the encoder block. The decoder block decodes them, and the reconstructed migration imaging profile can be obtained.

Next, the loss function value can be computed according to the reconstructed migration imaging profile and the amplitude-normalized high-precision migration imaging profile, so as to train the initial neural network model based on the loss function value. In the embodiments of the present disclosure, the specific calculation method of the loss function value is not defined, and the user can design according to the actual situation. It only needs to ensure that the greater the error between the reconstructed migration imaging profile and the amplitude-normalized high-precision migration imaging profile is, the greater the loss function value is. When training the model, it can also adopt the batch processing.

The prediction result of the neural network is generally normalized to [−1, 1] or [0, 1]. Therefore, after outputting the prediction result (i.e., the reconstructed migration imaging profile) by the decoder block, it needs to perform the amplitude recovery (i.e., denormalization) processing on the prediction result, so that the effective seismic amplitude can be obtained. The amplitude recovery function is realized by the denormalization layer. After learning the amplitude relationship between the input data (the set of multi-azimuth migration imaging profiles) and the label data (the high-precision migration imaging profile), the denormalization layer can perform the denormalization processing on the reconstructed migration imaging profile, so as to obtain the high-precision migration imaging profile after amplitude recovery.

The embodiments of the present disclosure do not specifically limit the structure of the Transformer neural network, and the user can select according to the actual requirements. Optionally, each layer of the Transformer neural network model is consisted of efficient multi-head attention (EMHA) and multi-layer perceptron (MLP).

In the efficient multi-head attention (EMHA), the input sequence first obtains Query, Key, and Value respectively by three different linear transformation layers. Then, these transformed vectors are divided into several "heads", and each head has its own independent Query, Key, and Value matrices. For each head, it is to perform a Scaled Dot-Product Attention operation computation. Finally, the outputs of all heads are spliced together and combined by one linear layer, thus obtaining the final attention output vector. In this way, the efficient multi-head attention (EMHA) can parallelly process the attention for the input sequence from different perspectives, which improves the ability of the Transformer neural network model to understand and capture complex dependency relationships; or the efficient multi-head attention (EMHA) acquires attention distributions of different subspaces of the input sequence by parallelly running multiple independent attentions, so as to capture the potential multiple feature associations in the sequence more comprehensively.

The multi-layer perceptron (MLP) is a component for further processing the information after the efficient multi-head attention. Through operations of two linear transformations and one nonlinear activation function, the Transformer neural network model can capture dependency relationships of different positions in the sequence and efficiently process and represent complex input data at the same time.

In an optional embodiment, the above step S2031 of performing normalization processing on the set of multi-azimuth migration imaging profiles of the target typical imaging line and the corresponding high-precision migration imaging profile respectively by the normalization layer includes the following steps:

- step S20311: determining an amplitude value of each position point in the set of multi-azimuth migration imaging profiles of the target typical imaging line, so as to obtain an amplitude value set corresponding to each migration imaging profile;
- step S20312: stacking amplitude values with the same serial number in all amplitude value sets, and taking absolute values after stack, so as to obtain a first target amplitude value set;
- step S20313: taking a maximum amplitude value in the first target amplitude value set as a normalization parameter of the set of multi-azimuth migration imaging profiles, so as to perform the normalization processing on the set of multi-azimuth migration imaging profiles;
- step S20314: determining an amplitude value of each position point in the high-precision migration imaging profile of the target typical imaging line, and taking an absolute value, so as to obtain a second target amplitude value set; and
- step S20315: taking a maximum amplitude value in the second target amplitude value set as a normalization parameter of the high-precision migration imaging profile, so as to perform the normalization processing on the high-precision migration imaging profile.

Specifically, the amplitude value set corresponding to all migration imaging profiles in the set of multi-azimuth migration imaging profiles of the target typical imaging line can be represented as: $\{D_1, D_2, \ldots D_i \ldots, D_{n_{AZIMUTH}}\}$, where $D_i$ represents the amplitude value set of all position points on the migration imaging profile with the azimuth number of i. Alternatively, $D_i$ can also be presented in the form of a two-dimensional array, wherein the position of the array component corresponds to the position of the pixel point. Based on the above description of the normalization processing on the set of multi-azimuth migration imaging profiles, it can be seen that the normalization parameter of the set of multi-azimuth migration imaging profiles is $p=\max(\mathrm{abs}(D_1+D_2+D_i \ldots +D_{n_{AZIMUTH}}))$, and the normalization processing result of the set of multi-azimuth migration imaging profiles is represented as:

$$(d_1, d_2, \ldots d_i \ldots, d_{n_{AZIMUTH}}) = \frac{(D_1, D_2, \ldots D_i \ldots, D_{n_{AZIMUTH}})}{p}.$$

If the amplitude value set of all position points on the high-precision migration imaging profile is L, then the normalization parameter of the high-precision migration imaging profile is max(abs(L)), and the normalization processing result of the high-precision migration imaging profile is represented as:

$$l = \frac{L}{\max(\mathrm{abs}(L))}.$$

In an optional embodiment, the above step S2037 of performing denormalization processing on the reconstructed migration imaging profile by the denormalization layer based on the set of multi-azimuth migration imaging profiles of the target typical imaging line and the corresponding high-precision migration imaging profile includes the following steps:

- step S20371: determining the amplitude value of each position point in the set of multi-azimuth migration imaging profiles of the target typical imaging line, so as to determine an average energy of the set of multi-azimuth migration imaging profiles based on the amplitude value to obtain a first energy;
- step S20372: determining the amplitude value of each position point in the high-precision migration imaging profile of the target typical imaging line, so as to determine an average energy of the high-precision migration imaging profile based on the amplitude value to obtain a second energy, and determining a maximum amplitude in the high-precision migration imaging profile;
- step S20373: determining a denormalization parameter of the reconstructed migration imaging profile based on the first energy, the second energy, and the maximum amplitude; and
- step S20374: performing the denormalization processing on the reconstructed migration imaging profile based on the denormalization parameter, so as to obtain the high-precision migration imaging profile after the amplitude recovery.

In the embodiment of the present disclosure, the denormalization parameter is represented as $m_L=\alpha\sqrt{E_D}$, where $$\alpha = \alpha_2\sqrt{\alpha_1}, \alpha_2 = \frac{\sqrt{E_L}}{\max(L)}, \alpha_1 = \frac{E_D}{E_L}, E_D$$

represents the first energy, $E_L$ represents the second energy, the energy of each position point in the imaging profile is the square of its amplitude, and max(L) represents the maximum amplitude in the high-precision migration imaging profile. The denormalization parameter $m_L$ is used to perform the denormalization processing on the reconstructed migration imaging profile, i.e., the amplitude recovery processing, represented as: $D_o=m_L D_p$, where $D_p$ represents the amplitude value set of all position points in the reconstructed migration imaging profile, and $D_o$ represents the amplitude value set of all position points in the high-precision migration imaging profile after the amplitude recovery.

In one embodiment, the training initial neural network, it is to preset the azimuthal spacing Δθ=45 degrees, i.e., the multiple azimuths are specifically $$n_{AZIMUTH} = \mathrm{int}\left(\frac{360}{45}\right) = 8$$

azimuths. In the neural network, the CNN layer of the network is set to 5 layers; the initial convolution kernel is set to 32; and the number of transformer heads is set to 8. The size of the input data is 128×128×8; and the initial learning rate is set to 0.001, which is reduced by half every 200 training epochs. The neural network model is trained by applying the Adam optimizer and the smoothing L1 loss function. During the training process, the total loss of the training dataset and the validation dataset is first computed, and then each is divided by its respective occupied storage space. The loss tends to stabilize after 400 training epochs. For the training data with the size of 8.6G, the neural network training can be completed in 4.8 hours.

Figure 4:
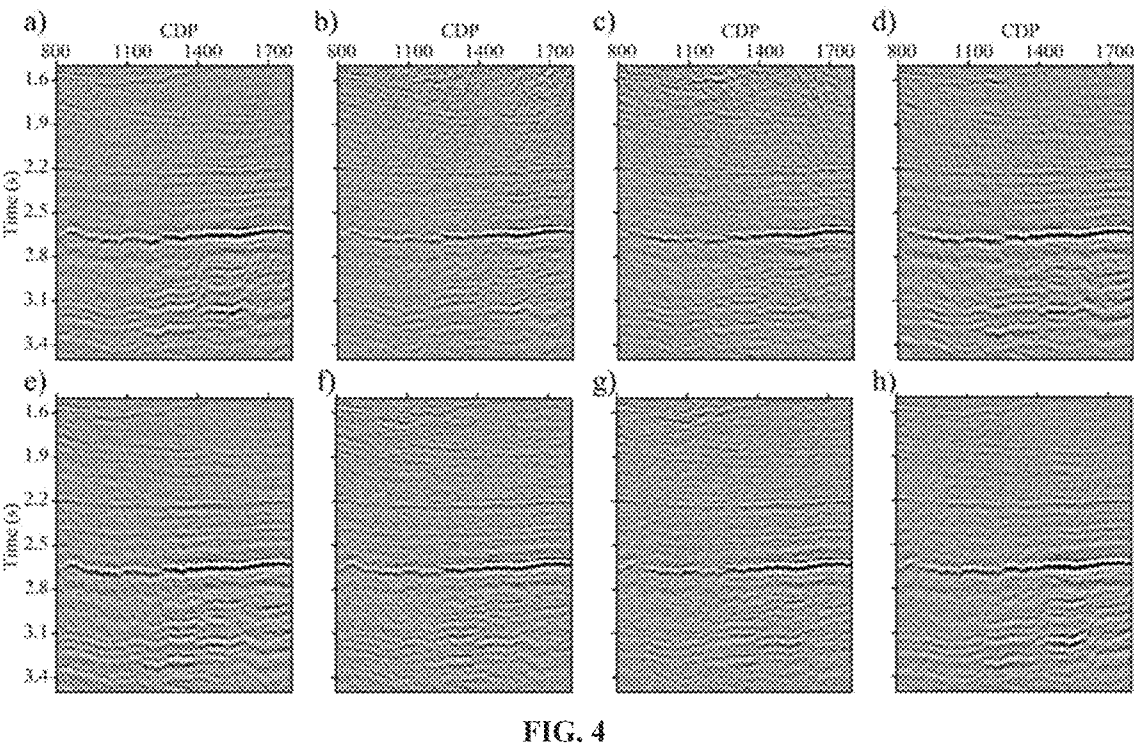
FIG. 4 shows a schematic diagram of a set of multi-azimuth migration imaging profiles provided by the embodiments of the present disclosure.
Figure 5:
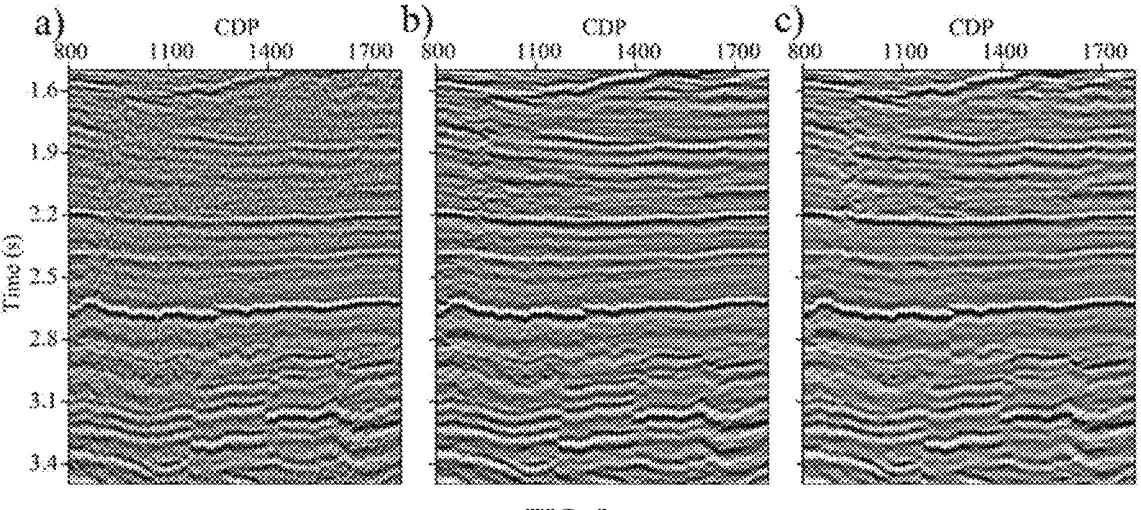
FIG. 5 shows a comparison diagram of imaging results of multiple seismic data imaging methods provided by the embodiments of the present disclosure.

In order to verify the performance of the embodiments of the present disclosure, FIG. 4 shows a schematic diagram of the set of multi-azimuth migration imaging profiles provided by the embodiments of the present disclosure, wherein the view a to the view h in FIG. 4 respectively corresponds to the following azimuth ranges: (a) 0°-45°, (b) 45°-90°, (c) 90°-135°, (d) 135°-180°, (e) 180°-225°, (f) 225°-270°, (g) 270°-315°, and (h) 315°-360°. FIG. 5 shows a comparison diagram of imaging results of multiple seismic data imaging methods provided by the embodiments of the present disclosure, wherein the view a in FIG. 5 is the result of direct stack of the multi-azimuthal migration profile set; the view b in FIG. 5 is the result of the migration stack after the Fresnel zone is picked up by human-computer interaction based on dip-angle domain migration gather of two azimuths (the Inline direction and the Crossline direction), and the view c in FIG. 5 is the prediction result by applying the target neural network model in the embodiments of the present disclosure.

The view a in FIG. 5 is a direct stack profile of the multi-azimuth migration profile set, which is equivalent to a migration profile with a fixed migration aperture. In the result image, the signal-to-noise ratio is very low, so the description for the subsurface geological structure is not clear, where the continuity of the horizontal stratum is disrupted, and fault points are blurred. Compared with the view a, the signal-to-noise ratio of the b view in the FIG. 5 is obviously improved. Especially, the random noise is significantly suppressed. The continuity of the horizontal strata and the delineation of fault discontinuities are noticeably enhanced compared to view a. However, there are relatively obvious regular noises within the time window of CDP850~1050, Time1.60S~3.10S, which is not conducive to the precise description of large fault from top to bottom in this region. It can be seen that in the section shown in the c view of FIG. 5, the random noise and the regular noise are both significantly suppressed and the complex structure of the subsurface medium is depicted more clearly, where the imaging of the continuity of the horizontal strata is better, the delineation of fault discontinuities are sharp, and the description is precise.

Embodiment 2

The embodiments of the present disclosure further provide a seismic data high-precision imaging device, wherein the device is mainly configured to perform the seismic data high-precision imaging method provided by the above embodiment. The seismic data high-precision imaging device provided by the embodiments of the present disclosure is described in detail below.

Figure 6:
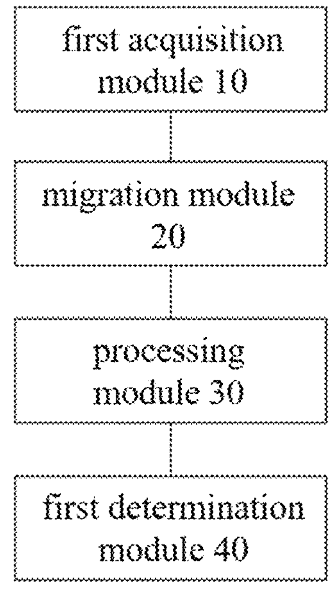
FIG. 6 shows a functional module diagram of a high-precision imaging device of seismic data provided by the embodiments of the present disclosure.

FIG. 6 shows a functional module diagram of the high-precision imaging device of seismic data provided by the embodiments of the present disclosure. As shown in FIG. 6, the device mainly includes: a first acquisition module 10, a migration module 20, a processing module 30, and a first determination module 40.

The first acquisition module 10 is configured to acquire the prestack seismic gather of the work zone to be imaged.

The migration module 20 is configured to perform the multi-azimuth prestack migration processing on the prestack seismic gather by the fixed migration aperture for each imaging line in the imaging space of the work zone to be imaged, so as to obtain the set of multi-azimuth migration imaging profiles of each imaging line.

The processing module 30 is configured to process the set of multi-azimuth migration imaging profiles of the target imaging line by using the target neural network model to obtain the high-precision migration imaging profile of the target imaging line, wherein the target neural network model is a lightweight neural network based on the Transformer neural network and the CNN neural network, the Transformer neural network is located between the encoder block and the decoder block of the CNN neural network, the training target of the target neural network model is that the error between the output prediction result of migration imaging profile and the actual high-precision migration imaging profile result is smaller than a preset threshold, and the target imaging line represents any imaging line in the imaging space.

The first determination module 40 is configured to determine the high-precision imaging result of the work zone to be imaged based on high-precision migration imaging profiles of all imaging lines.

In the seismic data high-precision imaging device provided by the embodiments of the present disclosure, after acquiring the prestack seismic gather of the work zone to be imaged, it firstly performs the multi-azimuth prestack migration processing on the prestack seismic gather by the fixed migration aperture for each imaging line in an imaging space, so as to obtain the set of multi-azimuth migration imaging profiles of each imaging line; and then it processes the set of multi-azimuth migration imaging profiles of the target imaging line by using the target neural network model, so as to obtain the high-precision migration imaging profile of the target imaging line. The target neural network model is a lightweight neural network based on the Transformer neural network and the CNN neural network, and the training target of the target neural network model is that the error between the output prediction result of migration imaging profile and the actual high-precision migration imaging profile result is smaller than the preset threshold. Therefore, it can ensure that the output migration imaging profile is of a high-precision imaging result, which effectively solves the technical problem of low imaging precision existed in the seismic data imaging method.

Optionally, the device further includes:

a second acquisition module, configured to acquire a prestack seismic gather of the training work zone;

a second determination module, configured to determine high-precision migration imaging profiles of multiple typical imaging lines and the corresponding set of multi-azimuth migration imaging profiles based on the prestack seismic gather of the training work zone, wherein each of the high-precision migration imaging profiles is an imaging profile obtained by performing migration processing with taking the Fresnel zone of the imaging point as the migration aperture; and a training module, configured to take the set of multi-azimuth migration imaging profiles of each of the typical imaging lines as the input data of the initial neural network model; take the corresponding high-precision migration imaging profile as the training label; and train the initial neural network model until reaching the training target, so as to obtain the target neural network model.

Optionally, the second determination module includes:

a computation unit, configured to compute the multi-azimuth dip-angle domain migration gather of the target typical imaging line based on the prestack seismic gather of the training work zone, wherein the target typical imaging line represents any imaging line in the multiple typical imaging lines;

a picking unit, configured to pick up the Fresnel zones of multiple typical imaging points by human-computer interaction based on the multi-azimuth dip-angle domain migration gather; and a migration unit, configured to perform the prestack migration processing on the prestack seismic gather of the training work zone using the Fresnel zones of the multiple typical imaging points as the migration aperture, so as to obtain the high-precision migration imaging profile of the target typical imaging line.

Optionally, the initial neural network model further includes: the normalization layer and the denormalization layer, wherein the training module includes:

a normalization unit, configured to perform normalization processing on the set of multi-azimuth migration imaging profiles of the target typical imaging line and the corresponding high-precision migration imaging profile respectively by the normalization layer, so as to obtain the set of amplitude-normalized multi-azimuth migration imaging profiles and the amplitude-normalized high-precision migration imaging profile;

an encoding unit, configured to encode each local time window data in the set of amplitude-normalized multi-azimuth migration imaging profiles by the encoder block, so as to extract the local feature and the profile position information of each local time window data;

an expansion unit, configured to perform feature expansion on local features of all local time window data to construct the long sequence of local feature;

an extraction unit, configured to extract the global feature and the effective feature of the long sequence of local feature by the Transformer neural network, so as to obtain a target feature sequence;

a folding unit, configured to perform feature folding on the target feature sequence, wherein the folded feature and the profile position information are decoded by the decoder block so as to obtain a reconstructed migration imaging profile;

a computation unit, configured to compute a loss function value based on the reconstructed migration imaging profile and the amplitude-normalized high-precision migration imaging profile, so as to train the initial neural network model based on the loss function value; and a denormalization unit, configured to perform denormalization processing on the reconstructed migration imaging profile by the denormalization layer based on the set of multi-azimuth migration imaging profiles of the target typical imaging line and the corresponding high-precision migration imaging profile, so as to obtain the high-precision migration imaging profile after amplitude recovery.

Optionally, the normalization unit is specifically configured to perform the following steps, including:

determining the amplitude value of each position point in the set of multi-azimuth migration imaging profiles of the target typical imaging line, so as to obtain the amplitude value set corresponding to each migration imaging profile;

stacking amplitude values with the same serial number in all amplitude value sets, and taking absolute values after stack, so as to obtain the first target amplitude value set;

taking the maximum amplitude value in the first target amplitude value set as the normalization parameter of the set of multi-azimuth migration imaging profiles, so as to perform the normalization processing on the set of multi-azimuth migration imaging profiles;

determining the amplitude value of each position point in the high-precision migration imaging profile of the target typical imaging line, and taking an absolute value, so as to obtain the second target amplitude value set; and taking the maximum amplitude value in the second target amplitude value set as a normalization parameter of the high-precision migration imaging profile, so as to perform the normalization processing on the high-precision migration imaging profile.

Optionally, the denormalization unit is specifically configured to perform the following steps, including:

determining the amplitude value of each position point in the set of multi-azimuth migration imaging profiles of the target typical imaging line, so as to determine an average energy of the set of multi-azimuth migration imaging profiles based on the amplitude value to obtain the first energy;

determining the amplitude value of each position point in the high-precision migration imaging profile of the target typical imaging line, so as to determine the average energy of the high-precision migration imaging profile based on the amplitude value to obtain the second energy, and determining a maximum amplitude in the high-precision migration imaging profile;

determining the denormalization parameter of the reconstructed migration imaging profile based on the first energy, the second energy, and the maximum amplitude; and performing the denormalization processing on the reconstructed migration imaging profile based on the denormalization parameter, so as to obtain the high-precision migration imaging profile after the amplitude recovery.

Optionally, the selection criteria for the typical imaging line are as follows: selecting the imaging line based on first spacing at the position with drastic structure changes; selecting the imaging line based on second spacing at the position with gentle structures; and the first spacing being smaller than the second spacing.

Embodiment 3

Figure 7:
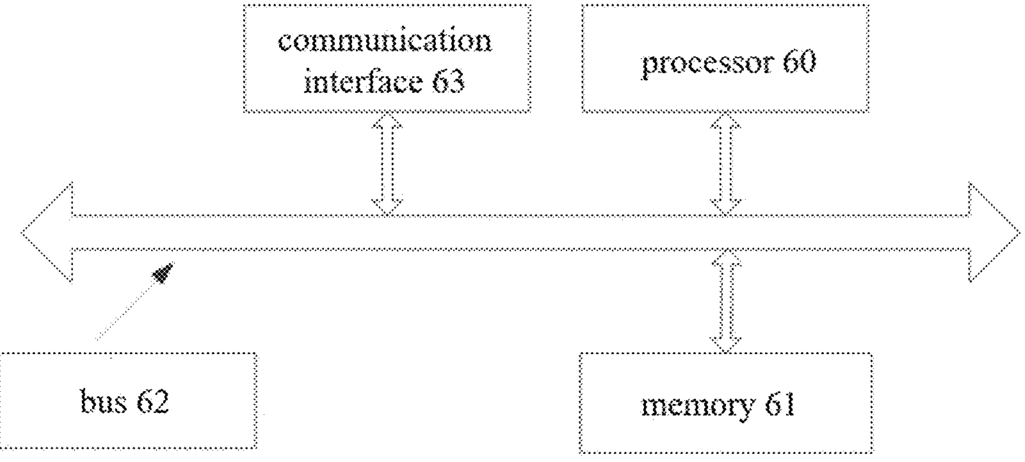
FIG. 7 shows a schematic diagram of an electronic device provided by the embodiments of the present disclosure.

Referring to FIG. 7, the embodiment of the present disclosure further provides an electronic device. The electronic device includes: a processor 60, a memory 61, a bus 62, and a communication interface 63, wherein the processor 60, the communication interface 63, and the memory 61 are connected by the bus 62, and the processor 60 is configured to execute executable modules stored in the memory 61, such as the computer program.

The memory 61 can include a RAM (random access memory) or a non-volatile memory, e.g., including at least one disk memory. The communication connection between the system network unit and the at least one other network unit is realized by the at least one communication interface 63 (which can be wired or wireless), and the Internet, the wide area network, the local network, and the metropolitan area network are all can be used.

The bus 62 can be an ISA bus, PCI bus, or EISA bus, etc. The bus can be divided into address bus, data bus, and control bus, etc. For ease of representation, only one two-way arrow is shown in FIG. 7, but it does not indicate that there is only one bus or one type of bus.

The memory 61 is configured to store the program; the processor 60 executes the program after receiving the execution instruction; and the method performed by the device as defined by the process disclosed in any one of the embodiments of the present disclosure can be applied to the processor 60 or realized by the processor 60.

The foregoing processor 60 can be an integrated circuit chip with the signal processing capability. In the implementation process, each step of the above method can be accomplished by integrated logic circuits of hardware in the processor 60 or by instructions in the form of software. The foregoing processor 60 can be a general purpose processor, including a central processing unit (CPU), a network processor (NP). Alternatively, it can also be a digital signal processor (DSP), an application specific integrated circuit (ASIC), a field programmable gate array (FPGA), or other programmable logic components, such as discrete gates, transistor logic components, or discrete hardware components, which is configured to realize or execute the methods, steps, and logic block diagrams disclosed in embodiments of the present disclosure. The general-purpose processor can be a microprocessor, or the processor can be any conventional processor, etc. The steps of the method disclosed in conjunction with the embodiments of the present disclosure can be directly performed by a hardware decoding processor, or performed with the combination of the hardware and software modules in the decoding processor. The software modules can be located in mature storage media in the field, such as random-access memory, flash memory, read-only memory, programmable read-only memory, electrically erasable programmable memory, or register. The storage medium is located in memory 61, and the processor 60 reads the information in memory 61 to complete the steps of the above method in conjunction with its hardware.

The embodiments of the present disclosure provide a computer program product of the seismic data high-precision imaging method and device, including a computer-readable storage medium storing processor-executable non-volatile program code, and the instructions included in the program code can be used to execute the method in the foregoing method embodiments. The specific implementation can be referred to as the method embodiments, which will not be repeated herein.

Additionally, the various functional units in various embodiments of the present disclosure can be integrated to form one process unit; each unit can physically and individually exist, or two or more units can be integrated into a single unit.

The function, if realized in the form of a software functional unit and sold or used as an individual product, it can be stored in a processor-executable, non-volatile, computer-readable storage medium. Based on this understanding, the technical solution of the present disclosure in essential, the part contributing to the prior art, or the part of the technical solutions can be embodied in the form of the software product. The computer software product is stored in a storage medium, including several instructions to cause a computer device (which can be a personal computer, a server, a network device, etc.) to perform all or part of the steps of the method described in each embodiment of the present disclosure. The foregoing storage medium includes: U disk, portable hard disk, ROM (read only-memory), RAM (random access memory), disk, disc, or other medium that can store the program code.

It should be noted that similar symbols and letters denote similar items in the following drawings, so that once an item is defined in a drawing, no further definition or explanation is required in the subsequent drawings.

In the description of the present disclosure, it should be noted that the orientation or position relationship indicated by the terms "center", "up", "down", "left", "right", "vertical", "horizontal", "inside", "outside", etc., is the orientation or position relationship based on the drawings, or is the orientation or position relationship of the product of the present disclosure customarily placed in use, which are only to facilitate the description of the present disclosure and simplify the description, and are not to indicate or imply that the device or component referred to must have a particular orientation, or be constructed and operated with a particular orientation, and therefore cannot to be understood as limitations of the present disclosure. Furthermore, the terms "first", "second", "third", etc., are used only to differentiate the description, and are not to be understood as indicating or implying relative importance.

Additionally, the terms "horizontal", "vertical", "overhanging", etc., do not mean that the component must be absolutely horizontal or overhanging, but can be slightly inclined, e.g., "horizontal" only refers that it is more horizontal than "vertical", and does not mean that the structure must be absolutely horizontal, but can be slightly inclined.

In the description of the present disclosure, it should also be noted that unless other expressly specifications and limitations, the terms "arrange", "mount", "connect", and "link" are to be understood in a broad sense, e.g., it can be a fixed connection, a detachable connection, or an integral connection; it can be a mechanical connection or an electrical connection; and it can be a direct connection, an indirect connection through an intermediate medium, or a communication inside two elements. For a person of ordinary skill in the art, the specific meaning of the above terms in the present disclosure can be understood according to specific situations.

Finally, it should be noted that the above embodiments are used to illustrate the technical solutions of the present disclosure, and are not to limit it. Although the present disclosure is described in detail with reference to the foregoing embodiments, it should not be difficult for a person skill in the art to understand that the technical solutions recorded in the foregoing embodiments can still be modified, or some or all of the technical features are be replaced by equivalent ones; and the modification or replacement shall not make the essence of the corresponding technical solutions depart from the scope of the technical solutions of each embodiment of the present disclosure.

The invention claimed is:

1. A seismic data imaging method comprising:

acquiring a prestack seismic gather of a work zone to be imaged;

performing multi-azimuth prestack migration processing on the prestack seismic gather by a fixed migration aperture for each imaging line in an imaging space of the work zone to be imaged, so as to obtain a set of multi-azimuth migration imaging profiles of each imaging line, wherein the fixed migration aperture is not smaller than a maximum dip-angle of a subsurface target structure to be imaged;

processing the set of multi-azimuth migration imaging profiles of a target imaging line by using a target neural network model, so as to enable both correct imaging of a subsurface dip-angle structure and migration noise suppression, to obtain a migration imaging profile of the target imaging line, wherein the target neural network model is a lightweight neural network constructed from a Transformer neural network and a convolutional neural network (CNN), the Transformer neural network is located between an encoder block and a decoder block of the CNN, a training target of the target neural network model is that an error between a prediction result of an output migration image profile and an actual migration image profile is smaller than a preset threshold, and the target imaging line represents any imaging line in the imaging space; and determining an imaging result of the work zone to be imaged based on migration imaging profiles of all imaging lines.

2. The seismic data imaging method according to claim 1, further comprising:

acquiring a prestack seismic gather of a training work zone;

determining migration imaging profiles of multiple typical imaging lines and a corresponding set of multi-azimuth migration imaging profiles based on the prestack seismic gather of the training work zone, wherein each of the migration imaging profiles is an imaging profile obtained by performing migration processing with taking a Fresnel zone of an imaging point as a migration aperture;

taking a set of multi-azimuth migration imaging profiles of each of the multiple typical imaging lines as input data of an initial neural network model; taking a corresponding migration imaging profile as a training label; and training the initial neural network model until reaching the training target, so as to obtain the target neural network model.

3. The seismic data imaging method according to claim 2, wherein determining the migration imaging profiles of the multiple typical imaging lines based on the prestack seismic gather of the training work zone comprises:

computing a multi-azimuth dip-angle domain migration gather of a target typical imaging line based on the prestack seismic gather of the training work zone, wherein the target typical imaging line represents any imaging line in the multiple typical imaging lines;

picking up Fresnel zones of multiple typical imaging points by human-computer interaction based on the multi-azimuth dip-angle domain migration gather; and performing prestack migration processing on the prestack seismic gather of the training work zone using the Fresnel zones of the multiple typical imaging points as the migration aperture, so as to obtain the migration imaging profile of the target typical imaging line.

4. The seismic data imaging method according to claim 3, wherein the initial neural network model further comprises: a normalization layer and a denormalization layer, and wherein taking the set of multi-azimuth migration imaging profiles of each of the multiple typical imaging lines as the input data of the initial neural network model; taking the corresponding migration imaging profile as the training label; and training the initial neural network model comprise:

performing normalization processing on the set of multi-azimuth migration imaging profiles of the target typical imaging line and the corresponding migration imaging profile respectively by the normalization layer, so as to obtain a set of amplitude-normalized multi-azimuth migration imaging profiles and an amplitude-normalized migration imaging profile;

encoding each local time window data in the set of amplitude-normalized multi-azimuth migration imaging profiles by the encoder block, so as to extract a local feature and profile position information of each local time window data;

performing feature expansion on local features of all local time window data to construct a sequence of the local feature;

extracting a global feature and an effective feature of the sequence of the local feature by the Transformer neural network, so as to obtain a target feature sequence;

performing feature folding on the target feature sequence, and decoding a folded feature and the profile position information by the decoder block, so as to obtain a reconstructed migration imaging profile;

computing a loss function value based on the reconstructed migration imaging profile and the amplitude-normalized migration imaging profile, so as to train the initial neural network model based on the loss function value; and performing denormalization processing on the reconstructed migration imaging profile by the denormalization layer based on the set of multi-azimuth migration imaging profiles of the target typical imaging line and the corresponding migration imaging profile, so as to obtain the migration imaging profile after amplitude recovery.

5. The seismic data imaging method according to claim 4, wherein performing the normalization processing on the set of multi-azimuth migration imaging profiles of the target typical imaging line and the corresponding migration imaging profile respectively by the normalization layer comprises:

determining an amplitude value of each position point in the set of multi-azimuth migration imaging profiles of the target typical imaging line, so as to obtain an amplitude value set corresponding to each migration imaging profile;

stacking amplitude values with a same serial number in all amplitude value sets, and taking absolute values after stack, so as to obtain a first target amplitude value set;

taking a maximum amplitude value in the first target amplitude value set as a normalization parameter of the set of multi-azimuth migration imaging profiles, so as to perform the normalization processing on the set of multi-azimuth migration imaging profiles;

determining an amplitude value of each position point in the migration imaging profile of the target typical imaging line, and taking an absolute value, so as to obtain a second target amplitude value set; and taking a maximum amplitude value in the second target amplitude value set as a normalization parameter of the migration imaging profile, so as to perform the normalization processing on the migration imaging profile.

6. The seismic data imaging method according to claim 4, wherein performing the denormalization processing on the reconstructed migration imaging profile by the denormalization layer based on the set of multi-azimuth migration imaging profiles of the target typical imaging line and the corresponding migration imaging profile comprises:

determining an amplitude value of each position point in the set of multi-azimuth migration imaging profiles of the target typical imaging line, so as to determine an average energy of the set of multi-azimuth migration imaging profiles based on the amplitude value to obtain a first energy;

determining an amplitude value of each position point in the migration imaging profile of the target typical imaging line, so as to determine an average energy of the migration imaging profile based on the amplitude value to obtain a second energy, and determining a maximum amplitude in the migration imaging profile;

determining a denormalization parameter of the reconstructed migration imaging profile based on the first energy, the second energy, and the maximum amplitude; and performing the denormalization processing on the reconstructed migration imaging profile based on the denormalization parameter, so as to obtain the migration imaging profile after the amplitude recovery.

7. An electronic device comprising a memory and a processor, wherein the memory stores computer programs executable on the processor, wherein the seismic data imaging method according to claim 2 is realized when the processor executes the computer programs.

8. A non-transitory computer-readable storage medium, wherein the non-transitory computer-readable storage medium stores computer instructions, and the seismic data imaging method according to claim 2 is realized when the computer instructions are executed by a processor.

9. The seismic data imaging method according to claim 1, wherein selection criteria for a typical imaging line are as follows: selecting the imaging line based on first spacing at a position with a first structure change; selecting the imaging line based on second spacing at a position with a second structure; and the first spacing being smaller than the second spacing.

10. An electronic device comprising a memory and a processor, wherein the memory stores computer programs executable on the processor, wherein the seismic data imaging method according to claim 1 is realized when the processor executes the computer programs.

11. A non-transitory computer-readable storage medium, wherein the non-transitory computer-readable storage medium stores computer instructions, and the seismic data imaging method according to claim 1 is realized when the computer instructions are executed by a processor.

12. A seismic data imaging device comprising:

a first acquisition module configured to acquire a prestack seismic gather of a work zone to be imaged;

a migration module configured to perform multi-azimuth prestack migration processing on the prestack seismic gather by a fixed migration aperture for each imaging line in an imaging space of the work zone to be imaged, so as to obtain a set of multi-azimuth migration imaging profiles of each imaging line, wherein the fixed migration aperture is not smaller than a maximum dip-angle of a subsurface target structure to be imaged;

a processing module configured to process a set of multi-azimuth migration imaging profiles of a target imaging line by using a target neural network model, so as to enable both correct imaging of a subsurface dip-angle structure and migration noise suppression, to obtain a migration imaging profile of the target imaging line, wherein the target neural network model is a light-weight neural network constructed from a Transformer neural network and a convolutional neural network (CNN), the Transformer neural network is located between an encoder block and a decoder block of the CNN, a training target of the target neural network model is that an error between a prediction result of an output migration image profile and an actual migration image profile is smaller than a preset threshold, and the target imaging line represents any imaging line in the imaging space; and a first determination module configured to determine an imaging result of the work zone to be imaged based on migration imaging profiles of all imaging lines.

* * * * *